United States Patent
Allouche et al.

(10) Patent No.: US 10,017,155 B1
(45) Date of Patent: Jul. 10, 2018

(54) CROSS CORRELATION BETWEEN CONNECTED VEHICLES AND OTHER ONLINE DEVICES

(71) Applicant: INTERNATIONAL BUSINESS MACHINES CORPORATION, Armonk, NY (US)

(72) Inventors: Yair Allouche, Dvir (IL); Oded Margalit, Ramat Gan (IL); Ravid Sagy, Beit Yizhack (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/437,852

(22) Filed: Feb. 21, 2017

(51) Int. Cl.
   *G01C 25/00* (2006.01)
   *B60R 25/102* (2013.01)
   *B60R 25/32* (2013.01)
   *B60R 25/01* (2013.01)

(52) U.S. Cl.
   CPC ............ *B60R 25/102* (2013.01); *B60R 25/01* (2013.01); *B60R 25/32* (2013.01)

(58) Field of Classification Search
   CPC ....... B60R 25/33; B60R 25/102; B60R 25/01; B60R 25/10; B60R 25/32; H04W 4/14; H04W 4/046; H04W 48/20; H04W 64/006; H04M 1/72577; H04M 1/72569; H04M 2250/10
   USPC .. 340/426.12, 426.1, 988, 995.28, 441, 936; 455/404.2, 418; 701/119, 117, 301
   See application file for complete search history.

(56) References Cited

U.S. PATENT DOCUMENTS

| | | | |
|---|---|---|---|
| 8,886,217 B2 | 11/2014 | Reitter et al. | |
| 8,965,626 B2 | 2/2015 | Kesavan et al. | |
| 9,231,967 B2 | 1/2016 | Ahn et al. | |
| 2011/0205040 A1 | 8/2011 | Van Wiemeersch et al. | |
| 2013/0344856 A1* | 12/2013 | Silver | H04M 1/72577 455/418 |

(Continued)

FOREIGN PATENT DOCUMENTS

| | | |
|---|---|---|
| WO | 2014158667 A1 | 10/2014 |
| WO | 2016151566 A1 | 9/2016 |

OTHER PUBLICATIONS

Argus, "Automotive Cyber Security," Argus Cyber Security, p. 1-6, https://argus-sec.com/, Accessed on Jan. 23, 2017.

(Continued)

*Primary Examiner* — Firmin Backer
*Assistant Examiner* — Munear Akki
(74) *Attorney, Agent, or Firm* — Robert C. Bunker

(57) ABSTRACT

Embodiments of the present invention disclose a method, computer system, and a computer program product for vehicle software security associated with a vehicle. The present invention may include collecting vehicle data from the vehicle. The present invention may also include collecting mobile device data from an authorized mobile device associated with an authorized operator. The present invention may then include comparing the collected vehicle data with the collected mobile device data. The present invention may further include determining that the collected vehicle data does not match the collected mobile device data. The present invention may include also sending an alert message to a security control application based on determining that the collected vehicle data does not match the collected mobile device data.

11 Claims, 5 Drawing Sheets

(56) References Cited

U.S. PATENT DOCUMENTS

| | | | |
|---|---|---|---|
| 2014/0195100 A1 | 7/2014 | Lundsgaard et al. | |
| 2015/0006099 A1* | 1/2015 | Pham | G01C 17/38 702/93 |
| 2015/0233718 A1* | 8/2015 | Grokop | G01C 21/165 701/501 |
| 2016/0103980 A1 | 4/2016 | Ricci et al. | |
| 2016/0321911 A1 | 11/2016 | Poder | |
| 2016/0344703 A1 | 11/2016 | Sharma et al. | |
| 2017/0015278 A1* | 1/2017 | Yap | B60R 25/102 |

OTHER PUBLICATIONS

Ariloutech, "Automotive Cyber Security," Arilou Technologies, p. 1, http://www.ariloutech.com/, Accessed on Jan. 23, 2017.

Checkoway et al., "Comprehensive Experimental Analyses of Automotive Attack Surfaces," USENIX Security Symposium, 2011, 16 Pages.

Francillon et al., "Relay Attacks on Passive Keyless Entry and Start Systems in Modern Cars," Proceedings of NDSS (Network and Distributed System Security Symposium), 2011, 15 Pages.

Koscher et al., "Experimental Security Analysis of a Modern Automobile," IEEE Symposium on Security and Privacy, 2010, p. 447-462, IEEE Computer Society.

Mell et al., "The NIST Definition of Cloud Computing," National Institute of Standards and Technology, Sep. 2011, p. 1-3, Special Publication 800-145.

Miller et al., "Adventures in Automotive Networks and Control Units," IOActive Technical White Paper, 2014, p. 1-99, IOActive, Inc.

Rouf et al., "Security and Privacy Vulnerabilities of In-Car Wireless Networks: A Tire Pressure Monitoring System case Study," Proceedings of the 19th USENIX Conference on Security (USENIX Security'10), 2010, p. 1-16.

Towersec, "Automotive Cyber Security Software," TowerSec Automotive Cyber Security, p. 1, http://tower-sec.com/, Accessed on Jan. 23, 2017.

Wolf et al., "Security in Automotive Bus Systems," Embedded Security in Cars Workshop (escar '04), 2004, p. 1-13.

Wolf et al., "Secure In-Vehicle Communication," Embedded Security in Cars, 2006, p. 95-109, Springer-Verlag Berlin Heidelberg.

IBM, "List of IBM Patents or Patent Applications Treated as Related (Appendix P)," Dec. 26, 2017, p. 1-2.

Allouche et al., "Cross Correlation Between Connected Vehicles and Other Online Devices," Application and Drawings, filed Dec. 26, 2017, 28 Pages, U.S. Appl. No. 15/854,258.

\* cited by examiner

US 10,017,155 B1

CROSS CORRELATION BETWEEN CONNECTED VEHICLES AND OTHER ONLINE DEVICES

BACKGROUND

The present invention relates generally to the field of computing, and more particularly to automotive security software.

The automotive industry is in the midst of a major transformation. New technologies facilitate many valuable capabilities such as improved driver safety, vehicle performance, and passenger comfort. Modern vehicles are essentially large and complex computer systems that are controlled and monitored by dozens of electronic control units (ECUs) that coordinate operations by communicating over one or more internal network buses. In addition, modern vehicles are becoming ever more connected through a plethora of external network interfaces, such as Radio frequency identification device (RFID), Bluetooth® (Bluetooth and all Bluetooth-based trademarks and logos are trademarks or registered trademarks of Bluetooth SIG, Inc. and/or its affiliates), dedicated short range communication (DSRC), wireless fidelity (wi-fi), and cellular. This connectivity may facilitate a variety of services including telematics, navigation, and safety that provide significant benefits for automakers, aftermarket vendors, fleet managers, and passengers. However, these capabilities also introduce new security and privacy concerns.

SUMMARY

Embodiments of the present invention disclose a method, computer system, and a computer program product for vehicle software security associated with a vehicle. The present invention may include collecting vehicle data from the vehicle. The present invention may also include collecting mobile device data from an authorized mobile device associated with an authorized operator. The present invention may then include comparing the collected vehicle data with the collected mobile device data. The present invention may further include determining that the collected vehicle data does not match the collected mobile device data. The present invention may include also sending an alert message to a security control application based on determining that the collected vehicle data does not match the collected mobile device data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
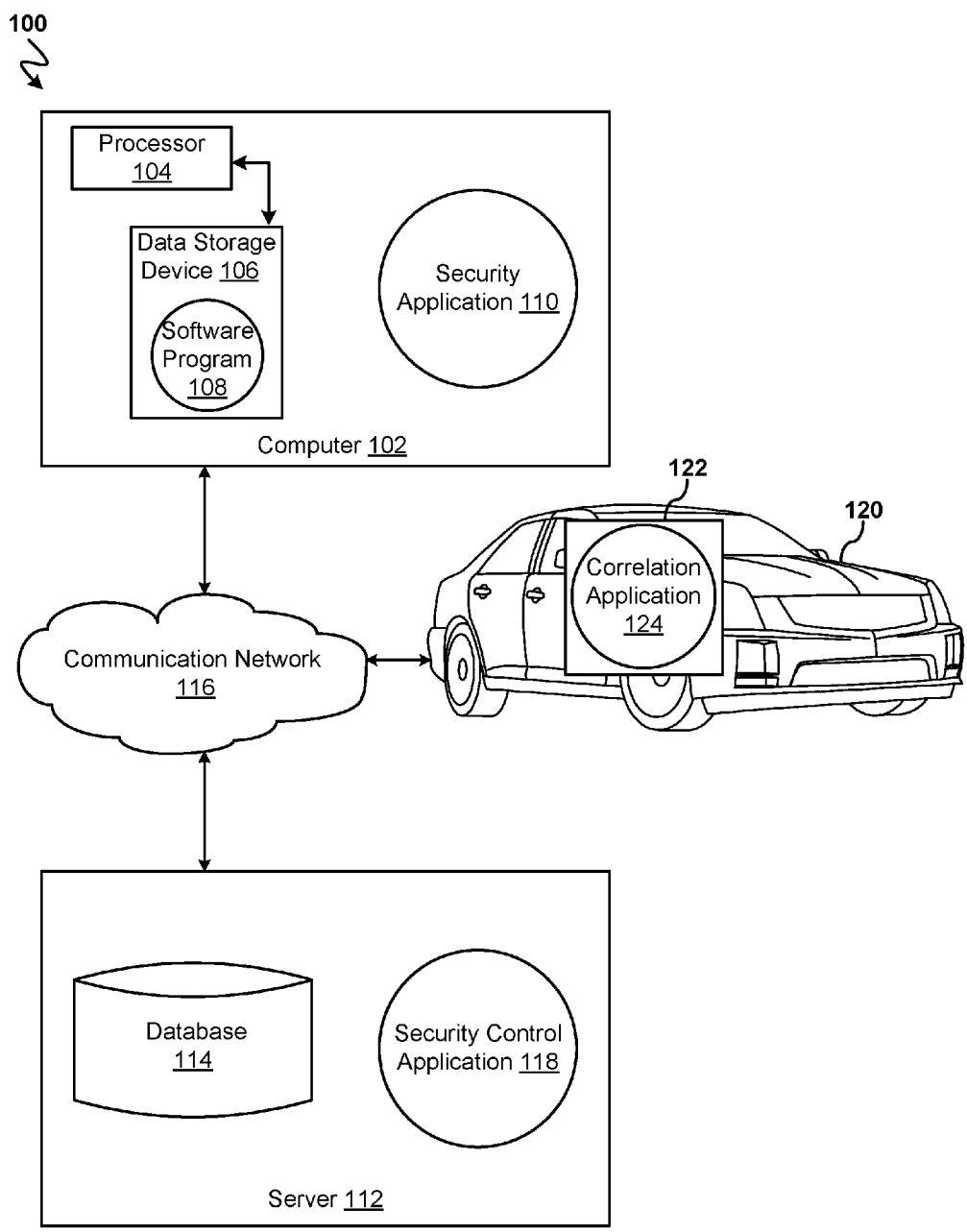
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described previously, the automotive industry is in the midst of a major transformation. New technologies facilitate many valuable capabilities such as improved driver safety, vehicle performance, and passenger comfort. Modern vehicles are essentially large and complex computer systems that are controlled and monitored by dozens of electronic control units (ECUs) that coordinate operations by communicating over one or more internal network buses. In addition, modern vehicles are becoming ever more connected through a plethora of external network interfaces, such as radio frequency identification device (RFID), Bluetooth®, dedicated short range communication (DSRC), wireless fidelity (wi-fi), and cellular. This connectivity may facilitate a variety of services including telematics, navigation, and safety that provide significant benefits for automakers, aftermarket vendors, fleet managers and passengers. However, these capabilities also introduce new security and privacy concerns.

Modern vehicles may be susceptible to cyber-attacks. Such attacks may evade network defenses and infect ECUs with malware to control a wide range of essential vehicle functions such as disabling the brakes and controlling the steering, acceleration, and displays of a target vehicle. Using remote exploitation techniques, a number of attack vectors (including Bluetooth® and cellular radio), may allow for remote control over the vehicle as well as eavesdropping on the passenger's cabin and tracking the vehicle's location. Additionally, the wireless interface of the tire pressure monitoring systems, the passive keyless entry, and engine start-up systems may all be hacked.

Therefore, it may be advantageous to, among other things, provide a way to add an additional security layer to detect automotive hacking and theft by comparing vehicle data with interconnected mobile device data carried by one or more vehicle users.

The following described exemplary embodiments provide a system, method and program product for cross correlation between connected vehicles and other online devices. As such, the present embodiment has the capacity to improve the technical field of automotive security software by comparing data derived from vehicle computing systems indicating a vehicle's status with data from mobile online devices associated with persons having the lawful right to drive the car, such as the car's owner. More specifically, vehicle sensor readings and other data may be compared with mobile device data to detect inconsistencies. Inconsistencies between data sets may then indicate a vehicle system hack or vehicle theft if no authorized mobile devices are connected to the vehicle.

According to at least one embodiment, a new security layer to validate the accuracy of internal parameters may be added to existing vehicle software systems. The security layer may be based on external devices, such as smartphones, that can calculate speed, identify direction, know the time of day, and the geographic location. The above information may be correlated with the internal Controller Area Network (CAN), Media Oriented System Transport (MOST), or Local Interconnected Network (LIN) bus (or any other relevant vehicle data bus). The security layer may generate hacking alerts in response to low correlations in general that may be indications of the car being hacked. Additionally, the security layer may generate theft alerts based on internal indications of the car moving without a communications connection (e.g., Bluetooth®) between the car and any of the smartphones or other mobile devices of the car owner or other persons authorized to drive the car. The assumption may be made that smartphones are personal devices usually moving together with their owner(s). If no relevant smartphones move together with the car based on comparing position, movement, and other geographic data, there may be a high probability that none of the authorized drivers are in the car raising the suspicion that car has been stolen. Additionally, if the car is moving and no mobile devices belonging to the authorized drivers are currently paired (i.e., connected) to the car, there also may be a suspicion that the car has been stolen. Alternatively, if a current paring between a mobile device belonging to an authorized driver and the moving car exists, then there may be an assumption that the car is moving with the consent of one of the authorized drivers (as a passenger or driver) and hence no suspicion of theft. Suspicion of a stolen car may trigger sending a short message service (SMS) to all the authorized car drivers who will have the option to remotely stop and inquire about the location of the car.

An application that runs on one of the car ECUs (e.g., the telematics ECU) may obtain relevant CAN bus messages and telematics information directly. Additionally, the application may obtain data from external measures of velocity, direction, and location from a smartphone wirelessly and compare the information from both types of sources. When the internal car parameters do not correlate with the matching external parameters, the application signals a management system of a possible hacking attack.

If the application senses that the car is moving based on internal parameters while no relevant smartphone generates similar indications, the application sends a predefined message to alert some, or all, of the phones of authorized drivers. Thereafter, express verification from the authorized drivers may be obtained indicating that the car may have been stolen or hacked before sending a request to the security control application to track or stop the vehicle remotely (when the assumption is that the driver may not be authorized).

The system may include three main new components: a correlation application as part of the connected car, a smartphone security application that connects with the car's correlation application, and an external security control application in the cloud.

The smartphone application may be installed on the smartphones of the authorized car operators. The application collects information regarding the smartphone's speed, location, direction, and so forth. The smartphone application communicates with the car's correlation application in different ways depending on the circumstances. When paired with the car's Bluetooth® or connected to the car's wi-fi, the smartphone application updates the car's correlation application with the calculated speed, location, and direction from the smartphone. When not paired with the car's Bluetooth® and not connected with the car's wi-fi, or when an unknown smartphone is connected and none of the authorized drivers' smartphones are connected, an SMS message is received when the car is moving and none of the authorized drivers' smartphones move with the car or are connected to the car currently. Finally, the smartphone application may be configured to obtain express verification from the authorized drivers that the car may have been stolen or hacked before sending a request to the security control application for tracking or stopping the vehicle remotely (when the assumption is that the driver may not be authorized).

The security control application may be a standalone application that receives information from the car's correlation application and requests from the smartphone applications. Based on the correlation application's data, combined with additional information on traffic, satellite, and cellular network status, the security control application concludes whether the car may be hacked or stolen. Based on this information or if the smartphone application makes the appropriate request, a message may be sent to the connected car in order to track, disable, activate the horn or alarm, or take other measures on the car remotely. Additionally, SMS messages may be sent to the authorized drivers smartphone applications when theft may be suspected.

The correlation application may run on one of the car's ECUs (e.g., the telematics ECU). The correlation application correlates data received from the car buses with data sent by the authorized drivers' smartphones. Specifically, the correlation application reads messages from the CAN bus (e.g., revolutions per minute (RPM) and wheel velocity), reads location information from the telematics ECU, receives location and speed information from one or more authorized drivers' smartphone applications that are paired with the car's Bluetooth® or connected to the car's wi-fi, and sends the data collected together with the correlation calculations to the security control application.

The correlation application calculates the current speed and location based on the data retrieved from the telematric ECU (and possible additional car sources) and correlates the current speed and location with the data received from the authorized drivers' smartphone applications. If the correlations are different than expected (based on predefined criteria), the correlation application suspects that the car might be hacked and sends a message to the security control application with all of the relevant information.

An additional scenario may include determining a car has been stolen based on determining that the car's movement does not correlate with the behavior of any of the authorized drivers' smartphones. Thereafter, the correlation application informs the security control application which then sends a predefined SMS alert message to all the relevant smartphones including the current location of the car.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a security application 110. The networked computer environment 100 may also include a server 112 that is enabled to run a security control application 118 that may interact with a database 114 and a communication network 116. The networked computer environment 100 may further include a connected vehicle 120 with an ECU 122 that is enabled to run a correlation application 124 and interact with the communication network 116. The networked computer environment 100 may include a plurality of computers 102, servers 112, and connected vehicles 120, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 and the connected vehicle 120 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the security application 110, security control application 118, and correlation application 124 may interact with a database 114 that may be embedded in various storage devices, such as, but not limited to a computer/mobile device 102, a networked server 112, a connected vehicle 120, or a cloud storage service.

According to the present embodiment, a user using a client computer 102, a server computer 112, or connected vehicle 120 may use the security application 110, security control application 118, or correlation application 124 (respectively) in combination to determine if a connected vehicle 120 has been hacked or stolen by comparing data generated by the connected vehicle 120 with the data generated by one or more client computers 102. The correlational vehicle software security method is explained in more detail below with respect to FIG. 2.

Figure 2:
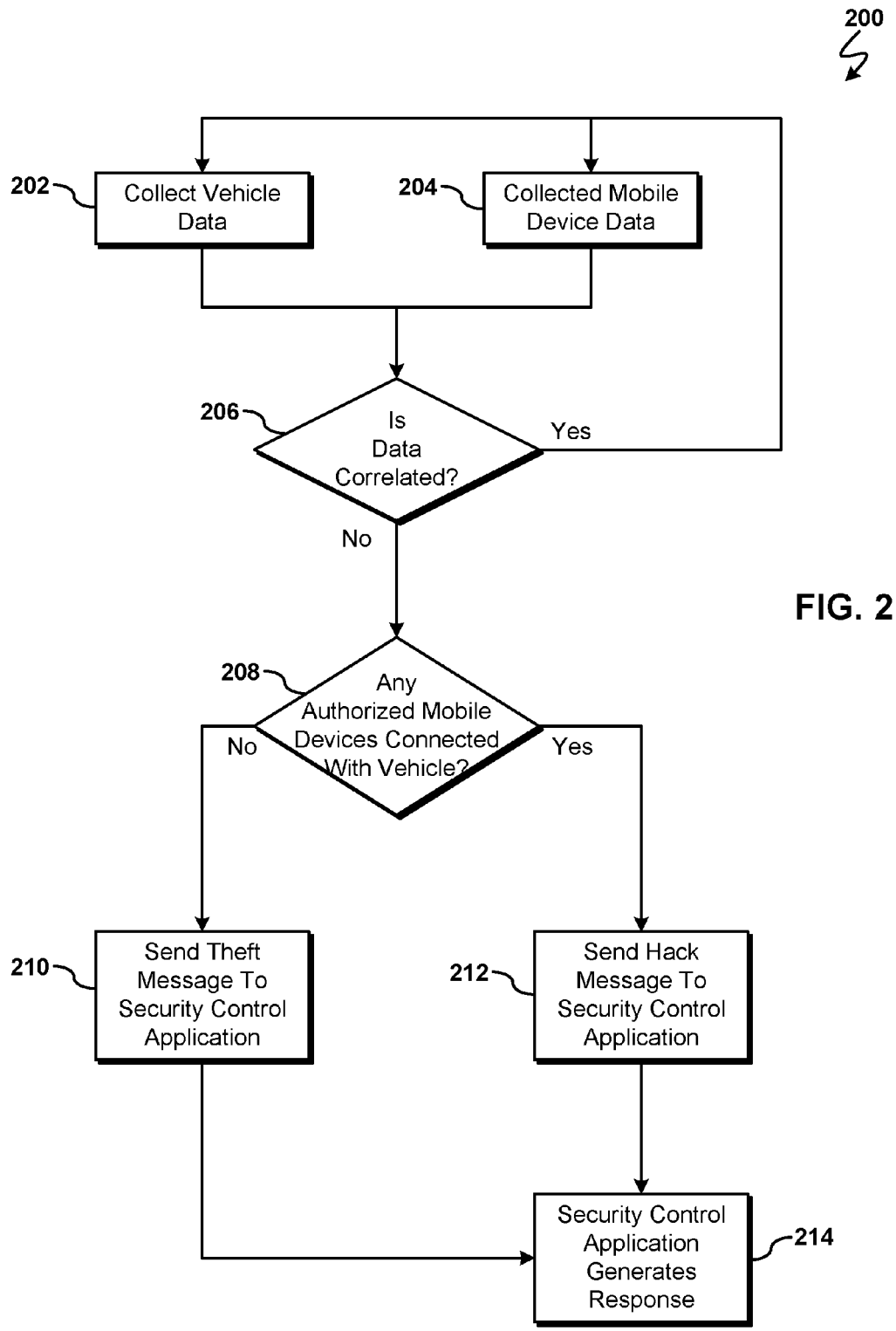
FIG. 2 is an operational flowchart illustrating a process for correlational vehicle software security according to at least one embodiment.

Referring now to FIG. 2, an operational flowchart illustrating the exemplary correlational vehicle software security process 200 used by the correlation application 124 according to at least one embodiment is depicted.

At 202, vehicle data is collected. Vehicle data may be collected from vehicle sensors, such as a speed sensor and accelerometers, and output from vehicle electronic control units (ECUs) 122. The correlation application 124 may read sensor and ECU data over the data bus used by the connected vehicle 120, such as a Controller Area Network (CAN) bus or equivalent data bus. According to at least one other embodiment, the vehicle data may be obtained directly from the sensors and ECUs 122 and may bypass the data bus. The collected vehicle data may be stored locally within the ECU 122 running the correlation application 124 within RAM or in a data repository, such as a database 114. Alternatively, the vehicle data may be stored remotely in a server 112 by sending the collected data over a network 116 from the connected vehicle 120. For example, a connected vehicle 120 using a CAN bus may have a vehicle speed sensor that determines vehicle speed, accelerometers that measure vehicle acceleration or deceleration, and an ECU 122 that receives the connected vehicle's 120 geographic location using global positioning system (GPS) coordinates. The correlation application 124 may connect to the vehicle's CAN bus and request, read, and store the data indicating vehicle speed, acceleration, and geographic location.

At 204, mobile device data is collected. Mobile device data may be collected by requesting the data from mobile devices associated with authorized operators of a particular connected vehicle 120 or the security application 110 running on the mobile devices may send relevant data at predefined intervals of time. Mobile device data may initially be collected by the security application 110 running on the mobile device. The security application 110 may collect relevant data generated by the mobile device's sensors, such as the mobile device's geographic location and altitude via GPS coordinates, and mobile device acceleration from accelerometers within the mobile device. Furthermore, mobile device movement and speed may be determined, for example, by changes in GPS location over time. Once the security application 110 has collected the relevant mobile device data, the collected mobile device data may be sent to the correlation application 124 via the connected vehicle's 120 internal network connection (e.g., wi-fi) in response to a request or at a predefined time interval.

For example, the correlation application 124 may request mobile device data from a mobile device associated with one of three authorized operators of the connected vehicle 120 that is currently connected by wi-fi to the connected vehicle 120. Thereafter, the mobile device will collect GPS data and other sensor data that indicates the position, movement, and acceleration of the mobile device. Then, the mobile device will send the collected mobile device data to the correlation application 124 in response to the request over the internal network 116 connection. Finally, the mobile device data from the mobile device is received by the correlation application 124 and stored.

Next, at 206, the correlation application 124 determines if the collected vehicle data and the collected mobile device data are correlated (i.e., match). The correlation application 124 may determine if data is correlated by comparing similar data points between the connected vehicle 120 and one or more mobile devices. Data may be correlated if data is within a threshold amount of variance, such as 10% difference, to account for discrepancies caused from the margin of error for the sensors involved. Each data point (e.g., speed, acceleration, altitude, and direction) may be compared. Differences that fall below the variance threshold may not raise suspicion of hacking, vehicle theft, or other anomaly. Each data point that exceeds the variance threshold may be recorded as well as the degree and direction (plus or minus) of the variance.

For example, the variance threshold may be 10% and the connected vehicle 120 speed is 60 miles per hour while the mobile device speed is 62 miles per hour. In this scenario, the vehicle speed data point will be correlated since the speed of the connected vehicle 120 and the mobile device are within 10% of each other. However, if the connected vehicle 120 speed is again 60 miles per hour and the mobile device speed is instead 35 miles per hour, then the difference between the speeds exceeds the variance threshold and there is no determined correlation for the speed data point. All of the data points (e.g., speed, acceleration, and altitude) being monitored may be similarly compared between the connected vehicle 120 and the mobile devices to determine if any data points exceed the variance threshold. If any data points exceed the variance threshold, then no correlation may be determined. If the data points are correlated (i.e., all data points do not exceed the variance threshold), then the correlation application 124 will return to collect vehicle data at 202 and collect mobile device data at 204.

According to at least one other embodiment, when a variance is detected that may be associated with a particular sensor in the connected vehicle 120, such as the vehicle speed sensor for the speed data point, the car bus (e.g., CAN bus) may queried for trouble codes for any detected faults related to that sensor. In some cases, the sensor fault may occur due to a malfunctioning sensor that may need service and result in a false positive indicator of malicious activity. Thus, data discrepancies related to sensors with fault codes may be ignored.

If the correlation application 124 determined that data is not correlated at 206, then the correlation application determines if any authorized mobile devices are connected to the connected vehicle 120 at 208. Authorized mobile devices include mobile devices, such as a smartphone or client computer 102, associated with one of the authorized vehicle operators. Mobile devices may connect with the connected vehicle 120 using a network 116, such as Bluetooth® and wi-fi. The correlation application 124 may interact with the vehicle data bus, such as CAN bus, or an ECU 122 within the connected vehicle 120 to determine which mobile devices are connected. By comparing mobile device identifiers associated with the authorized mobile devices to the mobile device identifiers associated with the currently connected mobile devices (if any), the correlation application 124 may determine if any authorized mobile devices are connected to the connected vehicle 120. Thus, if the data did not correlate at 206 and no authorized mobile devices are connected to the connected vehicle 120 at 208, a suspicion that the connected vehicle 120 was stolen may be raised. Mobile device identifiers and authorized vehicle operators may be identified and handled through a registration process before the correlational vehicle software security process 200 begins. This registration data may be stored in a data repository, such as a database 114, and distributed to the correlation application 124.

If the correlation application 124 determined that no authorized mobile devices are connected to the connected vehicle 120 at 208, then the correlation application 124 sends a theft alert message to the security control application 118 at 210. The theft alert message may be a predefined message that is sent indicating the connected vehicle 120 may have been stolen. The message may also include data point values and determined variances.

However, if the correlation application 124 determined that at least one authorized mobile device is connected to the connected vehicle 120 at 208, then the correlation application 124 sends a hack alert message to the security control application 118 at 212. The hack alert message may be a predefined message sent indicating the connected vehicle 120 may have been hacked. The message may also include data point values and determined variances.

If the correlation application 124 sent a theft message to the security control application 118 at 210, or a hack message to the security control application 118 at 212, then the security control application 118 will generate an appropriate response at 214. The response may include sending a message indicating a hack or theft to the authorized mobile devices belonging to the authorized operators of the connected vehicle 120. Furthermore, in the case of receiving a theft message, the security control application 118 may prompt the mobile devices of the authorized operators through the security application 110 to authorize tracking the connected vehicle 120, activating the horn, stopping the connected vehicle 120, or taking some other measure. The results of the prompt may be sent back to the security control application 118 to communicate with the correlation application 124 to obtain tracking information, activate the horn, or to stop the connected vehicle 120 via the car data bus, an ECU, or the like. The security control application 118 may also send SMS messages to the mobile devices belonging to authorized operators to indicate the possible theft or hack of the connected vehicle 120 for any authorized mobile devices that may not be currently connected to the connected vehicle 120.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
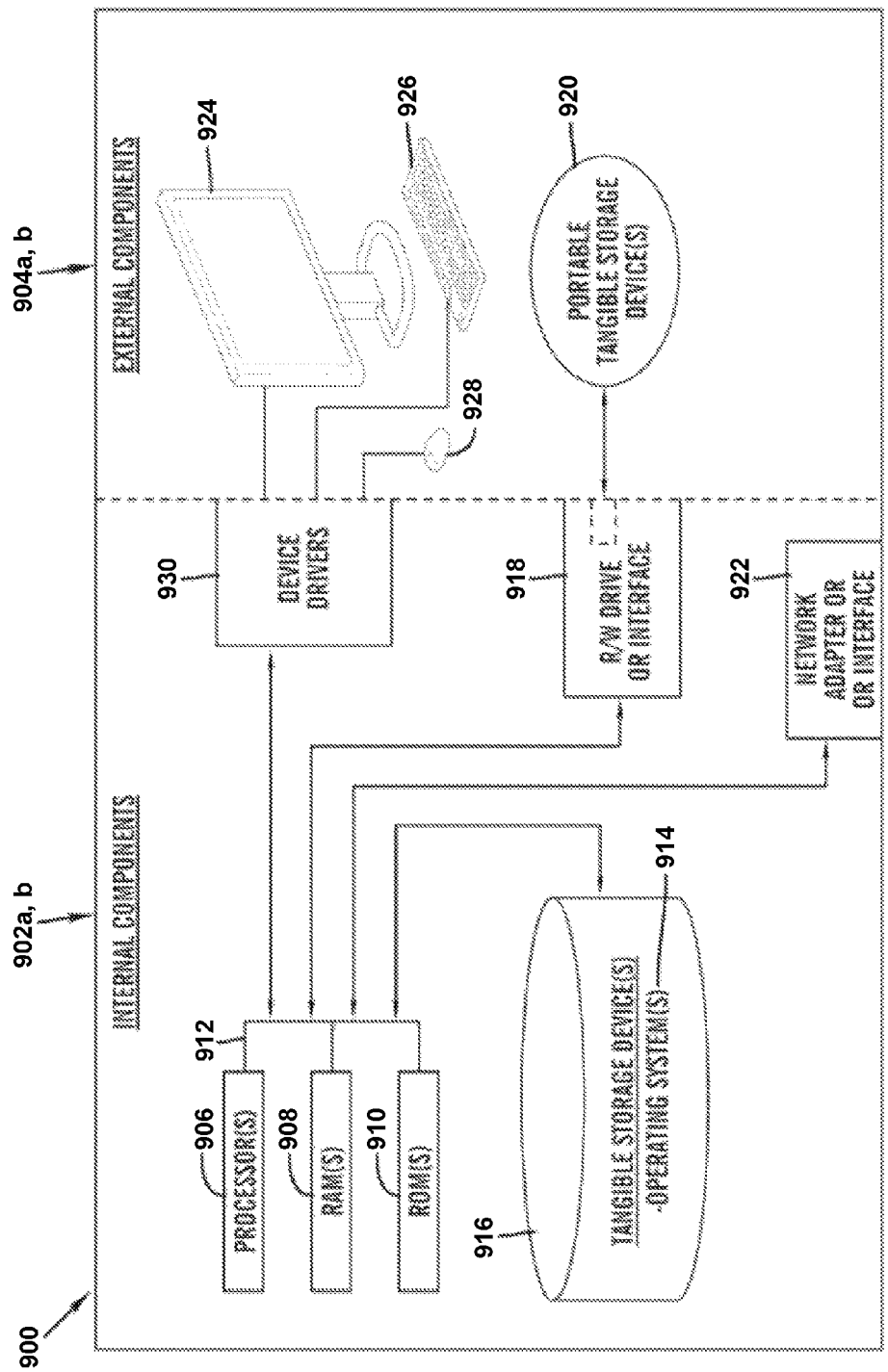
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smartphone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the security application 110 in client computer 102, and the security control application 118 in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108, the security application 110, the correlation application 124, and the security control application 118 can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the security application 110 in client computer 102 and the security control application 118 in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the security application 110 in client computer 102 and the security control application 118 in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
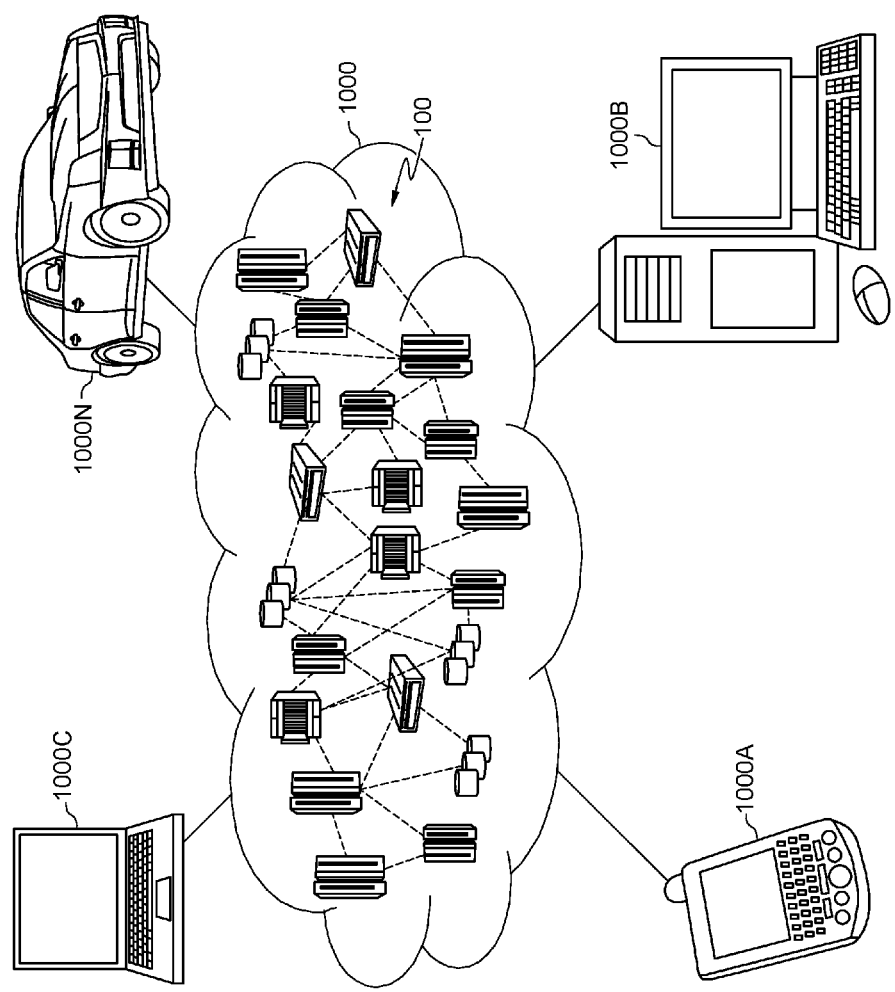
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
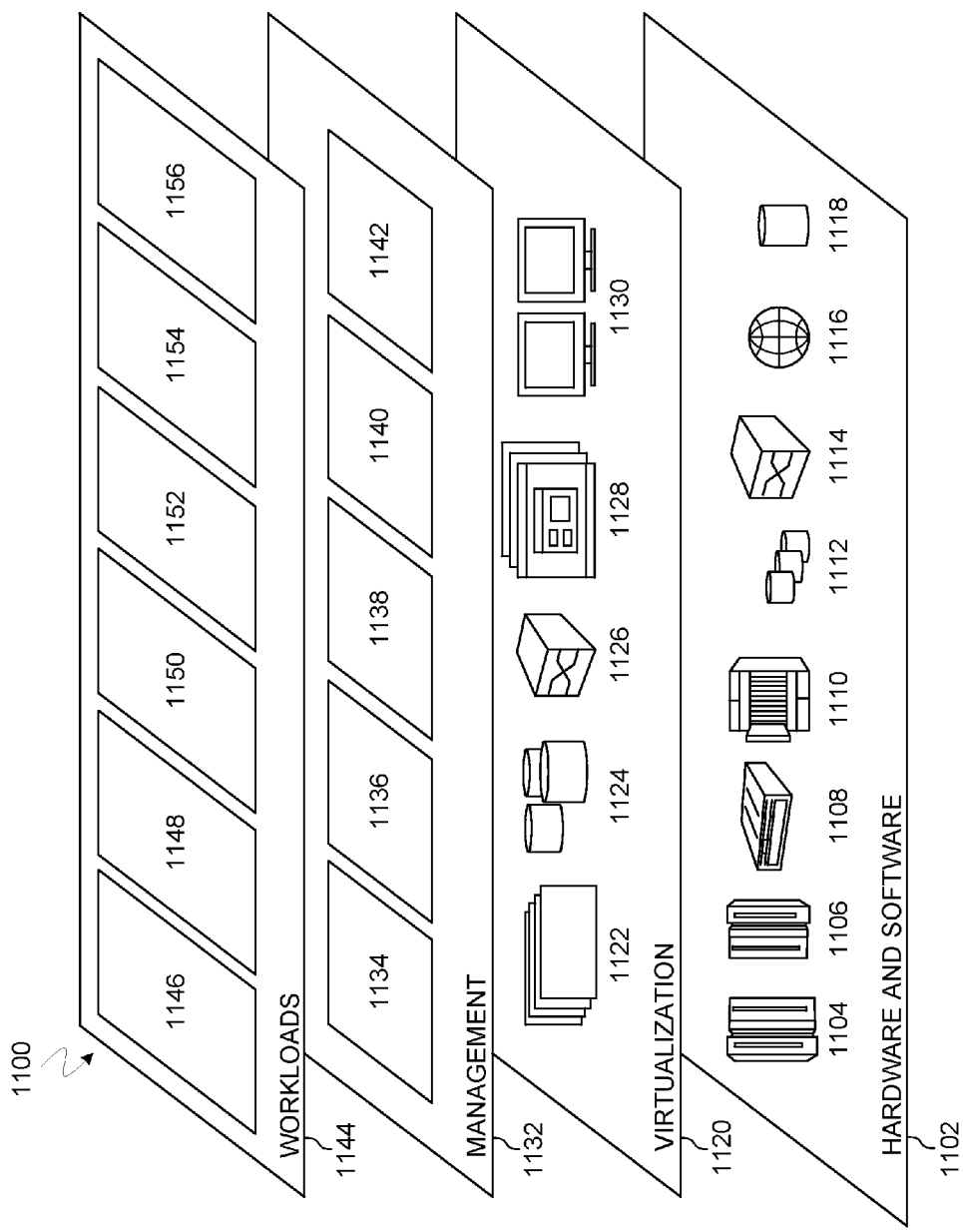
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and correlational vehicle software security 1156. Correlational vehicle software security provides a way to detect and respond to vehicle software hacks and vehicle theft by comparing vehicle sensor data to mobile phone data associated with authorized vehicle operators.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for vehicle software security associated with a vehicle, the method comprising:
    collecting vehicle data from the vehicle, wherein the vehicle data is selected from the group consisting of a vehicle speed, a vehicle acceleration, a vehicle movement direction, and a vehicle altitude;
    collecting mobile device data from an authorized mobile device associated with an authorized operator, wherein the mobile device data is selected from the group consisting of a device speed, a device acceleration, a device movement direction, and a device altitude;
    comparing the collected vehicle data with the collected mobile device data, wherein comparing the collected vehicle data with the collected mobile device data comprises comparing the vehicle speed with the device speed, comparing the vehicle acceleration with the device acceleration, comparing the vehicle movement direction with the device movement direction, and comparing the vehicle altitude with the device altitude;
    determining that the collected vehicle data does not match the collected mobile device data; and
    sending an alert message to a security control application based on determining that the collected vehicle data does not match the collected mobile device data.

2. The method of claim 1, further comprising:
    in response to determining that the collected vehicle data does not match the collected mobile device data, determining that the authorized mobile device is not connected to the vehicle; and
    sending a theft alert message to the authorized mobile device based on determining that the authorized mobile device is not connected to the vehicle.

3. The method of claim 1, further comprising:
    sending a hack alert message to the authorized mobile device sending an alert message to a security control application.

4. The method of claim 2, wherein the sent theft alert message comprises prompting the authorized operator with an option to disable the vehicle.

5. The method of claim 2, wherein determining that the authorized mobile device is not connected to the vehicle comprises determining that a device identifier associated with the authorized mobile device does not match a connected device identifier associated with at least one device connected to the vehicle.

6. A computer system for vehicle software security associated with a vehicle, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
collecting vehicle data from the vehicle, wherein the vehicle data is selected from the group consisting of a vehicle speed, a vehicle acceleration, a vehicle movement direction, and a vehicle altitude;
collecting mobile device data from an authorized mobile device associated with an authorized operator, wherein the mobile device data is selected from the group consisting of a device speed, a device acceleration, a device movement direction, and a device altitude;
comparing the collected vehicle data with the collected mobile device data, wherein comparing the collected vehicle data with the collected mobile device data comprises comparing the vehicle speed with the device speed, comparing the vehicle acceleration with the device acceleration, comparing the vehicle movement direction with the device movement direction, and comparing the vehicle altitude with the device altitude;
determining that the collected vehicle data does not match the collected mobile device data; and
sending an alert message to a security control application based on determining that the collected vehicle data does not match the collected mobile device data.

7. The computer system of claim 6, further comprising:
in response to determining that the collected vehicle data does not match the collected mobile device data, determining that the authorized mobile device is not connected to the vehicle; and
sending a theft alert message to the authorized mobile device based on determining that the authorized mobile device is not connected to the vehicle.

8. The computer system of claim 6, further comprising:
sending a hack alert message to the authorized mobile device sending an alert message to a security control application.

9. The computer system of claim 7, wherein the sent theft alert message comprises prompting the authorized operator with an option to disable the vehicle.

10. The computer system of claim 7, wherein determining that the authorized mobile device is not connected to the vehicle comprises determining that a device identifier associated with the authorized mobile device does not match a connected device identifier associated with at least one device connected to the vehicle.

11. A computer program product for vehicle software security associated with a vehicle, comprising:
one or more non-transitory computer-readable storage medium and program instructions stored on at least one of the one or more non-transitory computer-readable storage medium, the program instructions executable by a processor, the program instructions comprising:
program instructions to collect vehicle data from the vehicle, wherein the vehicle data is selected from the group consisting of a vehicle speed, a vehicle acceleration, a vehicle movement direction, and a vehicle altitude;
program instructions to collect mobile device data from an authorized mobile device associated with an authorized operator, wherein the mobile device data is selected from the group consisting of a device speed, a device acceleration, a device movement direction, and a device altitude;
program instructions to compare the collected vehicle data with the collected mobile device data, wherein comparing the collected vehicle data with the collected mobile device data comprises comparing the vehicle speed with the device speed, comparing the vehicle acceleration with the device acceleration, comparing the vehicle movement direction with the device movement direction, and comparing the vehicle altitude with the device altitude;
program instructions to determine that the collected vehicle data does not match the collected mobile device data; and
program instructions to send an alert message to a security control application based on determining that the collected vehicle data does not match the collected mobile device data.

* * * * *